(12) United States Patent
Foti (10) Patent No.: US 9,118,745 B2
(45) Date of Patent: Aug. 25, 2015

(54) REMOTE ACCESS TO A DEVICE IN AN IMS SYSTEM WITH A SECOND MEDIA ACCESS CHANNEL

(75) Inventor: George Foti, Dollard-des-Ormeaux (CA)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 761 days.

(21) Appl. No.: 12/969,857

(22) Filed: Dec. 16, 2010

(65) Prior Publication Data

US 2011/0179437 A1 Jul. 21, 2011

Related U.S. Application Data

(60) Provisional application No. 61/295,873, filed on Jan. 18, 2010.

(51) Int. Cl.
*H04L 29/08* (2006.01)
*H04L 29/06* (2006.01)
(Continued)

(52) U.S. Cl.
CPC .......... *H04L 65/80* (2013.01); *H04L 29/06217* (2013.01); *H04L 65/1086* (2013.01); *H04L 67/14* (2013.01); *H04N 21/64322* (2013.01); *H04W 28/26* (2013.01);
(Continued)

(58) Field of Classification Search
CPC .............. H04L 67/14; H04L 65/1016; H04N 21/64322
USPC ........... 725/25, 37, 38, 59, 74, 78, 80–82, 85, 725/86, 87, 91, 93, 98, 100; 709/200, 709/217–219, 227–229, 249; 370/328–330, 370/338, 348, 436, 437, 443, 468, 477; 455/450–455

See application file for complete search history.

(56) References Cited

U.S. PATENT DOCUMENTS 7,979,516 B2 * 7/2011 Dacosta ........................ 709/221
2009/0100147 A1 * 4/2009 Igarashi ........................ 709/218
(Continued)

FOREIGN PATENT DOCUMENTS

WO 2007045278 A1 4/2007
WO 2009/071132 A1 6/2009
(Continued)

OTHER PUBLICATIONS

Open IPTV Forum, OIPF-T1-R2 Functional Architecture V2.0, Sep. 8, 2009, pp. 01-234.
(Continued)

*Primary Examiner* — Hai V Tran
*Assistant Examiner* — Jason Thomas
(74) *Attorney, Agent, or Firm* — David J Rahmer; Ericsson Canada Inc.

(57) ABSTRACT

Remote access of content in an IMS system is described. A first IMS channel is established between, for example, a user terminal and an IMS Gateway (IG) for control signaling. A second IMS channel is established between, for example, the user terminal and the IG for conveying the content being remotely accessed. Due to limitations in the network, Quality of Service (QoS, or bandwidth) reservations are handled differently on the originating and terminating sides. For example, on the originating side, a single QoS reservation is used for both the first and second IMS channels, whereas on the terminating side separate QoS reservations can be used for the first and second IMS channels.

16 Claims, 8 Drawing Sheets

(51) Int. Cl.
*H04N 21/643* (2011.01)
*H04W 28/26* (2009.01)
*H04W 76/02* (2009.01)

(52) U.S. Cl.
CPC ........ *H04W 76/022* (2013.01); *H04L 65/1016* (2013.01); *H04L 65/4084* (2013.01)

(56) References Cited

U.S. PATENT DOCUMENTS

| | | |
|---|---|---|
| 2009/0248794 A1 | 10/2009 | Helms et al. |
| 2009/0304009 A1 | 12/2009 | Kolhi et al. |
| 2009/0307307 A1 | 12/2009 | Igarashi |
| 2010/0135279 A1 | 6/2010 | Petersson et al. |
| 2010/0150123 A1 | 6/2010 | Kim et al. |
| 2011/0107379 A1* | 5/2011 | Lajoie et al. ................ 725/87 |

FOREIGN PATENT DOCUMENTS

| | | | |
|---|---|---|---|
| WO | WO 2009087429 A1 * | 7/2009 | |
| WO | 2009/148382 A1 | 12/2009 | |
| WO | WO 2009148379 A2 * | 12/2009 | ............ H04N 7/173 |
| WO | 2010/001491 A1 | 1/2010 | |

OTHER PUBLICATIONS

Andreas Fasbender et al, Virtually at home: High-performance access to personal media, Ericsson Review No. 2, May 7, 2008, pp. 58-63.
PCT Search Report from corresponding application PCT/IB2011/050218.
ETSI TS 185 010 V.2.1.1, Telecommunications and Internet converged Services and Protocols for Advanced Networking (TISPAN); Customer Premises Networks: Protocol Specification (Stage 3), Jul. 2009, pp. 1-58.

* cited by examiner

REMOTE ACCESS TO A DEVICE IN AN IMS SYSTEM WITH A SECOND MEDIA ACCESS CHANNEL

RELATED APPLICATION

The present application is related to, and claims priority from, U.S. Provisional Patent Application No. 61/295,873, filed Jan. 18, 2010, entitled "Remote Access to an IPTV terminal with a Second Media Access Channel", to George Foti, the disclosure of which is incorporated herein by reference.

TECHNICAL FIELD

This disclosure relates generally to the manner in which resources are reserved in a data network for traffic such as streaming traffic in an IPTV environment making use of an IMS network.

BACKGROUND

As technology advances, the options for communications have become more varied. For example, in the last 30 years in the telecommunications industry, personal communications have evolved from a home having a single rotary dial telephone, to a home having multiple telephone, cable and/or fiber optic lines that accommodate both voice and data. Additionally cellular phones and Wi-Fi have added a mobile element to communications. Similarly, in the entertainment industry, 30 years ago there was only one format for television and this format was transmitted over the air and received via antennas located at a home. This has evolved into both different standards of picture quality such as, standard definition TV (SDTV), enhanced definition TV (EDTV) and high definition TV (HDTV), and more systems for delivery of these different television display formats such as cable and satellite. Additionally, services have grown to become overlapping between these two industries. As these systems continue to evolve in both industries, the service offerings will continue to merge and new services can be expected to be available for a consumer. Also these services will be based on the technical capability to process and output more information, for example as seen in the improvements in the picture quality of programs viewed on televisions, and therefore it is expected that service delivery requirements will continue to rely on more bandwidth being available throughout the network including the "last mile" to the end user.

Another related technology that impacts both the communications and entertainment industries is the Internet. The physical structure of the Internet, and associated communication streams, has also evolved to handle an increased flow of data. Servers have more memory than ever before, communications links exist that have a higher bandwidth than in the past, processors are faster and more capable and protocols exist to take advantage of these elements. As consumers' usage of the Internet grows, service companies have turned to the Internet (and other IP networks) as a mechanism for providing traditional services. These multimedia services can include Internet Protocol television (IPTV, referring to systems or services that deliver television programs over a network using IP data packets), video on demand (VOD), voice-over-IP (VoIP), and other web related services.

To accommodate the new and different ways in which IP networks are being used to provide various services, new network architectures are being developed and standardized. One such development is the Internet Protocol Multimedia Subsytem (IMS). IMS is an architectural framework which uses a plurality of Internet Protocols (IP) for delivering IP multimedia services to an end user. A goal of IMS is to assist in the delivery of these services to an end user by having a horizontal control layer which separates the service layer and the access layer.

In an IMS/IPTV environment, it is often desirable for a remote access function to be provided, e.g. to allow remote access to content that can be sent to the OITF or another terminal. Those skilled in the art will appreciate that remote access specifications are detailed in the ETSI TS 185 010 V 2.1.1 standard, which is publicly available. A mobile device, such as a mobile phone equipped with a remote access client, can access content in the home based on Digital Living Network Alliance (DLNA) and Universal Plug and Play (UPnP) procedures. This remote access requires the establishment of an IMS channel between the mobile and the gateway with a specific QoS. Once that IMS channel is established, Internet Protocol Security (IPSEC) is established between the remote ends to secure the traffic over that channel.

The IMS secure channel, once established, can be used to exchange DLNA traffic between the mobile and home devices in a secure manner. Once the mobile device selects specific content for streaming there are two options for allocating resources to stream the content. In a first option, the current QoS reservation for the already established IMS channel can be modified to allow for the additional bandwidth for the content to be streamed. A second option is to establish a second IMS channel with the proper QoS reservation, this second IMS channel is then used for streaming the content selected by the end user to be remotely accessed.

The aforementioned ETSI TS 185 010 V 2.1.1 standard specifies and describes the use of the first option. However, those skilled in the art will appreciate that this mechanism results in the content streamed to the mobile device being encrypted twice, which is inefficient, and increases the computational complexity of the decoding operation, which may be beyond the processing power available in many mobile devices. Additionally, the double decryption increases the latency, which has an adverse effect on the user experience.

As such the second option is more desirable. However, one issue related to the second approach is that for two IMS channels established between the mobile and the IMS gateway (IG) in the user premises, the IP address associated with each channel will be the same, although the ports are different. For the terminating side of the communication link (i.e., the IG side) the session border gateway (SBG) and/or edge router involved in IMS for reserving QoS often work at both the at the IP level and the port level.

On the other hand in the access network by which the mobile device is connected, typically a cellular data network, the GGSN only works at the IP address level. As such, the GGSN does not see any difference between the two IMS channels allocated to the same IG (which have the same terminating IP address but specify different ports), and from the GGSN point of view they are treated as a single QoS reservation. If normal IMS channel establishment procedures are followed, multiple QoS reservations will be made, one for the IMS channel used for DLNA control, and one reservation for the second IMS channel used for DLNA media streaming. For the second channel used for streaming, the GGSN will often return an error case, as the request to the GGSN for a new reservation will have the same IP addresses as the first channel for which the GGSN has already allocated a QoS when the first IMS session was established.

Therefore, it would be desirable to provide a system and method for providing remote access channels with accurate and valid QoS in a manner that, for example, prevents mishandling at intermediate nodes in the network.

SUMMARY

A system and method for providing a second media channel allows for the obviation of a double encryption system at the IG, while still ensuring adequate Quality of Service (QoS) by having the IG (or another node such as the RA or the IPTV Control Server) create an upstream connection to the content providing network with a QoS value equal to the sum of the two QoS values needed to support two separate channels. By having an intermediate node serve as a bridge, two streams to the same IP address can be accommodated using different ports.

Remote access of content in an IMS system is described. A first IMS channel is established between, for example, a user terminal and an IMS Gateway (IG) for control signaling. A second IMS channel is established between, for example, the user terminal and the IG for conveying the content being remotely accessed. Due to limitations in the network, Quality of Service (QoS, or bandwidth) reservations are handled differently on the originating and terminating sides. For example, on the originating side, a single QoS reservation is used for both the first and second IMS channels, whereas on the terminating side separate QoS reservations can be used for the first and second IMS channels.

According to a first exemplary embodiment, a method for remote access of content in an Internet Multimedia Subsystem (IMS) communication system includes the steps of establishing a first IMS channel with a device having access to the content, performing control signaling associated with the remote access of the content via the first IMS channel, establishing a second IMS channel with the device having access to the content using a Quality of Service (QoS) reservation value equal to zero, and receiving said content via the second IMS channel.

According to another exemplary embodiment, a device for remote access of content in an Internet Multimedia Subsystem (IMS) communication system includes a processor configured to establish a first IMS channel with a device having access to the content, to perform control signaling associated with the remote access of the content via the first IMS channel, to establish a second IMS channel with the device having access to the content using a Quality of Service (QoS) reservation value equal to zero, and to receive the content via the second IMS channel.

ACRONYM LIST

ACL Access Control List
ASM Authentication Session Management
CC Cluster Controller
CDNC Content Delivery and Network Control
CDF Content Delivery Function
CoD Content on Demand
FE Functional Entity
GGSN Gateway GPRS Support Node
IG IMS Gateway
IMS IP Multimedia Subsystem
IP Internet Protocol
IPTV IP Television
OIPF Open IPTV Forum
OITF Open IPTV Terminal Function
RAC Resource Admission Control
RTSP Real Time Streaming Protocol
SBG Session Border Gateway URL Uniform Resource Locator
XML eXtensible Markup Language

BRIEF DESCRIPTION OF THE DRAWINGS

Embodiments of the present invention will now be described, by way of example only, with reference to the attached Figures, wherein.

DETAILED DESCRIPTION

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

According to exemplary embodiments, a remote access method and system treats the two data flows for the two IMS channels as a single QoS flow from a GSSN point of view for QoS enforcement, and as two separate flows from the SBG or edge router point of view for QoS enforcement. Thus, in the GGSN the QoS value allocated is the combined QoS value for both IMS channels seen by the SBG, whereas in the SBG or edge router two separate QoS values are maintained.

A first IMS channel for the remote access is setup toward a DLNA device which has the desired content, for the purposes of DLNA control signaling. When a second IMS channel is needed, i.e., to stream the content being remotely accessed, an initial QoS for the second channel is requested with a bandwidth allocation of zero. This prevents requests from being sent to the GGSN, which otherwise would result in an error since the GGSN has already provided a QoS reservation for an IMS channel to the same IP address. After the second IMS channel is established, the QoS of the first IMS channel is modified (in one exemplary embodiment, this modification can be performed by the IG). Such a modification allows the GGSN at the originating end to handle the QoS for the combination of the two IMS channels. This is not ideal for the SBG (or edge router) which requires that both streams be treated independently. Hence the IG according to exemplary embodiments handles the terminating side of the connection so that the QoS can be properly adjusted without adverse results from the SBG or the edge router. The IG then modifies the QoS resources for the first IMS channel to return back to its original value without propagating such a change to the content originating side. The QoS for the second IMS channel is then increased from zero to the desired value, also without propagating the change to the content originating side.

Figure 1:
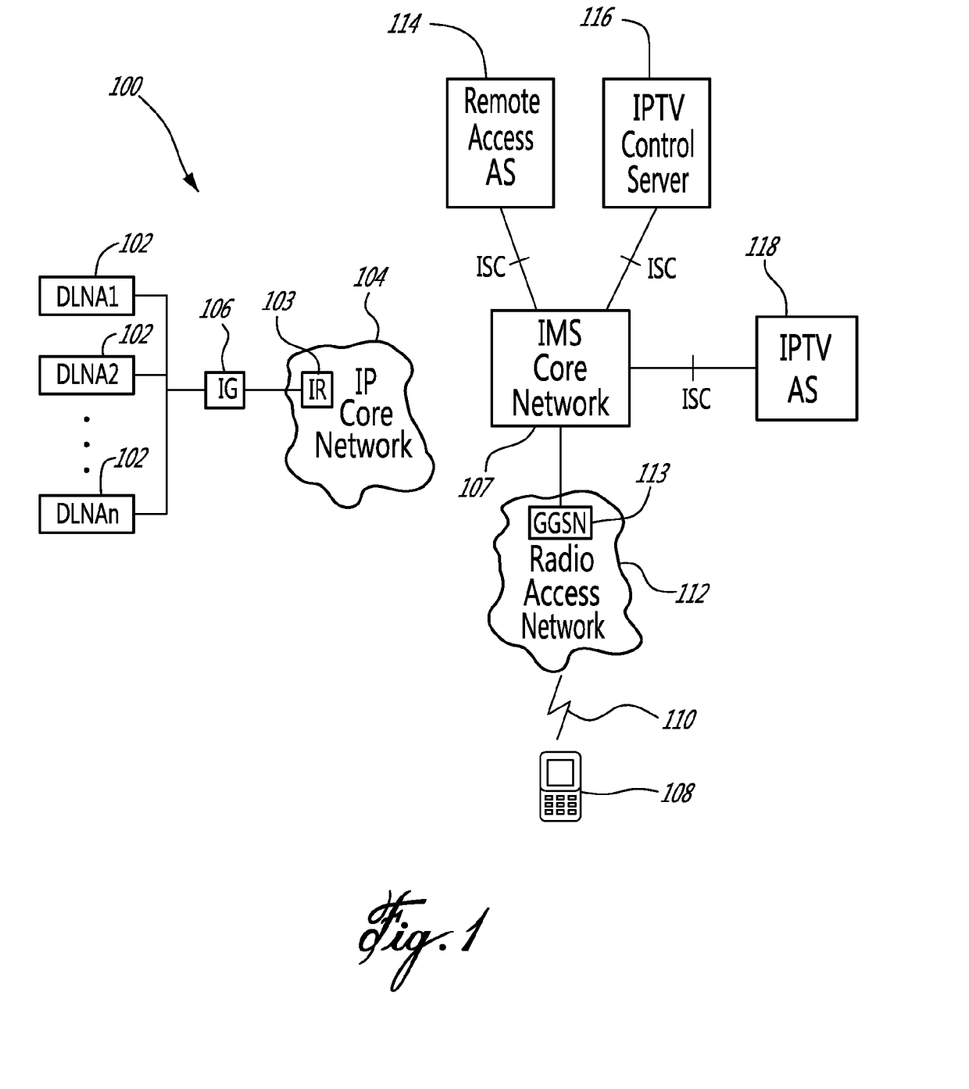
FIG. 1 depicts an exemplary communication system in which exemplary embodiments can be implemented.

In order to provide some context for a more detailed discussion of the exemplary embodiments, FIG. 1 illustrates an exemplary communications network 100 in which these exemplary embodiments can be implemented. Therein, a number of remotely accessible devices, e.g., IPTV devices, a home server, etc., are connected to an edge router (ER) 103 (or alternatively a Session Border Gateway) in an IP core network 104 via an IMS gateway (IG) and access router 106, and ultimately to an IMS core network 107. The remotely accessible devices 102 may, for example, be located in a home associated with an end user (although such a location for devices 102 is not required) and may, for example, be DLNA compliant devices, including but not limited to IPTV devices which are described in more detail below. In the example of FIG. 1, an end user associated with the remotely accessible devices 102 (e.g., having access rights to one or more of the devices 102) is operating an end user device 108 remotely relative to the devices 102.

In this particular example, the end user device 108 is a mobile phone, which is wirelessly connected to the IMS core network 107 via an air interface 110 through a radio access network 112. The radio access network includes, among other nodes, a Gateway GPRS Support Node (GGSN) 113. However it should be appreciated that this system architecture is purely illustrative and that, for example, the end user may be connected to the IMS core network using any type of device, wirelessly or via wireline. Various application servers (AS) such as a remote access (RA) AS 114, IPTV control server 116, and IPTV AS 118 can also be connected to the IMS core network, e.g., via IMS Service Control (ISC) interfaces.

The RA AS 114 provides remote access services to end users in a manner which will be described in more detail below. The IPTV AS 116 provides IPTV services, e.g., digital television signals delivered using IP over a network architecture (such as IMS) and which may be combined with telephone services (such as VoIP), web access, video on demand (VoD), etc. A typical IPTV device 102 can, for example, be capable of displaying a variety of video signals, associated with different content types, and can also be used for voice communications. In particular an IPTV device 102 is capable of receiving signals using IP protocols either directly or via a set-top box (not shown).

The set-top box, if present, typically acts to control inputs to an IPTV device 102, can contain a removable smart card (not shown) such as an IP multimedia services identity module (ISIM) application on a universally integrated circuit card (UICC) and is in communications with both an IPTV 102 and IP core network 104 (potentially through an IG 106, if not integrated therewith). The UICC contains memory within which security information and applications can be stored. An Open ITV Terminal Function (OITF) can run on either (or is distributed between) IPTV 102 or the set-top box. For the interested reader, many more details regarding IPTV systems in general are described in the standard specification OIPF-T1-R2-Functional Architecture V 2.0, Sep. 8, 2009, promulgated by the Open IPTV Forum, the disclosure of which is incorporated here by reference. According to some exemplary embodiments, the IPTV control server 116 may (or may not) play a role in remote access of devices 102.

It will be appreciated that the exemplary network shown in FIG. 1 will typically contain many other nodes, e.g., switches, routers, application servers, access points and the like, which are omitted to simplify the discussion. Nonetheless, in the network 100 of FIG. 1, it will further be appreciated that a user operating end user device 108 can remotely access content which is available via one or more of the remotely accessible devices 102 using the techniques according to exemplary embodiments which will now be described with respect to the signaling diagrams of FIGS. 2-5.

Figure 2:
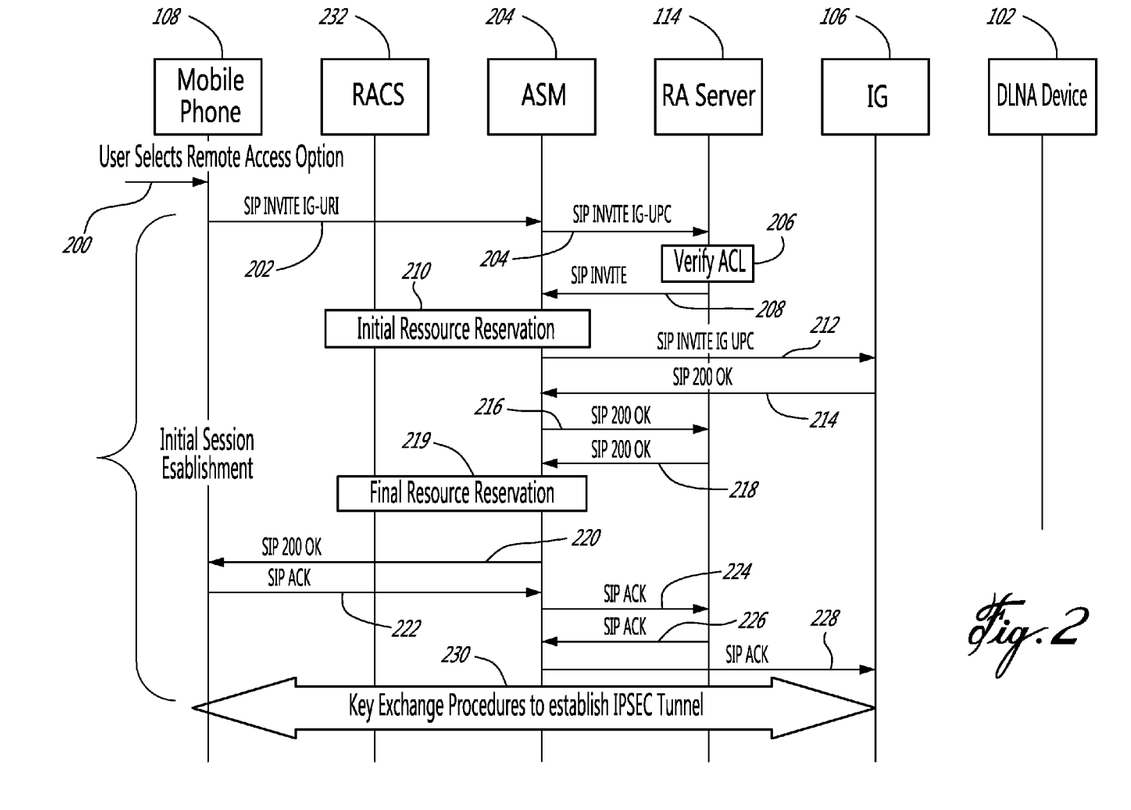
FIG. 2 illustrates the initiation of a VPN for DLNA Control traffic according to an exemplary embodiment.

Starting with FIG. 2, an exemplary call flow which can be used to initially set up a remote access session, i.e., to establish a virtual private network (VPN) connection from the mobile phone 108 towards the IG 106, is illustrated. This establishes the first IMS channel which will be used as described above for DLNA traffic purposes. In step 200, the user initiates a remote access (RA) client application, e.g., by selecting an RA option on the mobile device 108. The mobile phone 108 transmits a SIP INVITE message 202 which is routed to the terminating IMS node, and the ASM 204 associated with the target URI for the IG 106. The SIP INVITE message 202 can include the RA ICSI identifier as described, for example, in ETSI Standards Document 185010.

In step/signal 204, the SIP INVITE message is forwarded to the RA server 114 as the access control list (ACL) is implemented in the RA server 114 according to this exemplary embodiment. Those skilled in the art will appreciate that this step can be modified appropriately if the ACL is implemented in a node other than the RA server 114. In step 206, the RA server 114 authorizes the request, and in steps/signals 208-230 the process follows the same steps as a typical IMS session setup, to establish an IMS session to the IG 106. That is, after the RA server 114 verifies that the end user is authorized to have remote access with one or more of the devices 102, the RA server 114 replies to the SIP INVITE 204 with an approving response, e.g., SIP INVITE 208 to proceed with session establishment. This triggers an initial resource reservation (QoS) for this first IMS channel which involves both the ASM 204 and the RACS 232, including the GGSN 113 (not shown in this Figure). The ASM 204 then contacts the IG 106 to inform it of the request to establish the IMS session via SIP signal 212.

The IG 106 acknowledges the session establishment request via SIP 200 OK message 214 which, in turn, triggers a sequence of acknowledgement messages 216, 218 between the IG 106 and ASM 204, which results in a final resource reservation 219 for this first IMS channel. The end user's device 108 is then informed that the first IMS channel has been established via SIP 200 OK signal 220, which the mobile phone 108 acknowledges via SIP ACK message 222. This acknowledgement is promulgated through the relevant nodes via signals 224, 226 and 228. After the IMS session is established, normal IPSEC procedures 230, i.e., based on IKE [IPSEC-IKE], can then be employed for exchanging the keys between the mobile phone 108 and the IG 106 to complete the setup of the VPN.

Although the IP control server 116 is not referenced in FIG. 2, those skilled in the art will note that, if the impacts for implementing the solution described herein are placed in the RA application server 114 then there is no specific need for a link to the IPTV control server 116. On the other hand if the impacts are put into the IPTV control server 116, then the IP control server 116 can be linked in to the call flow described above with respect to FIG. 2 as well, i.e., the SIP INVITE 204 can be routed to the IP control server 116 instead of the RA server 114. Moreover, if the IPTV control server 116 is used in this context, then it will be necessary to inform the IPTV control server that the session to be setup is associated with a remote access (rather than, for example, content on demand or linear TV). This can be accomplished using any desired mechanism, e.g., using the Request URI, an RA ICSI, or some other information element to inform the IPTV control server 116 of the session type.

Figure 3:
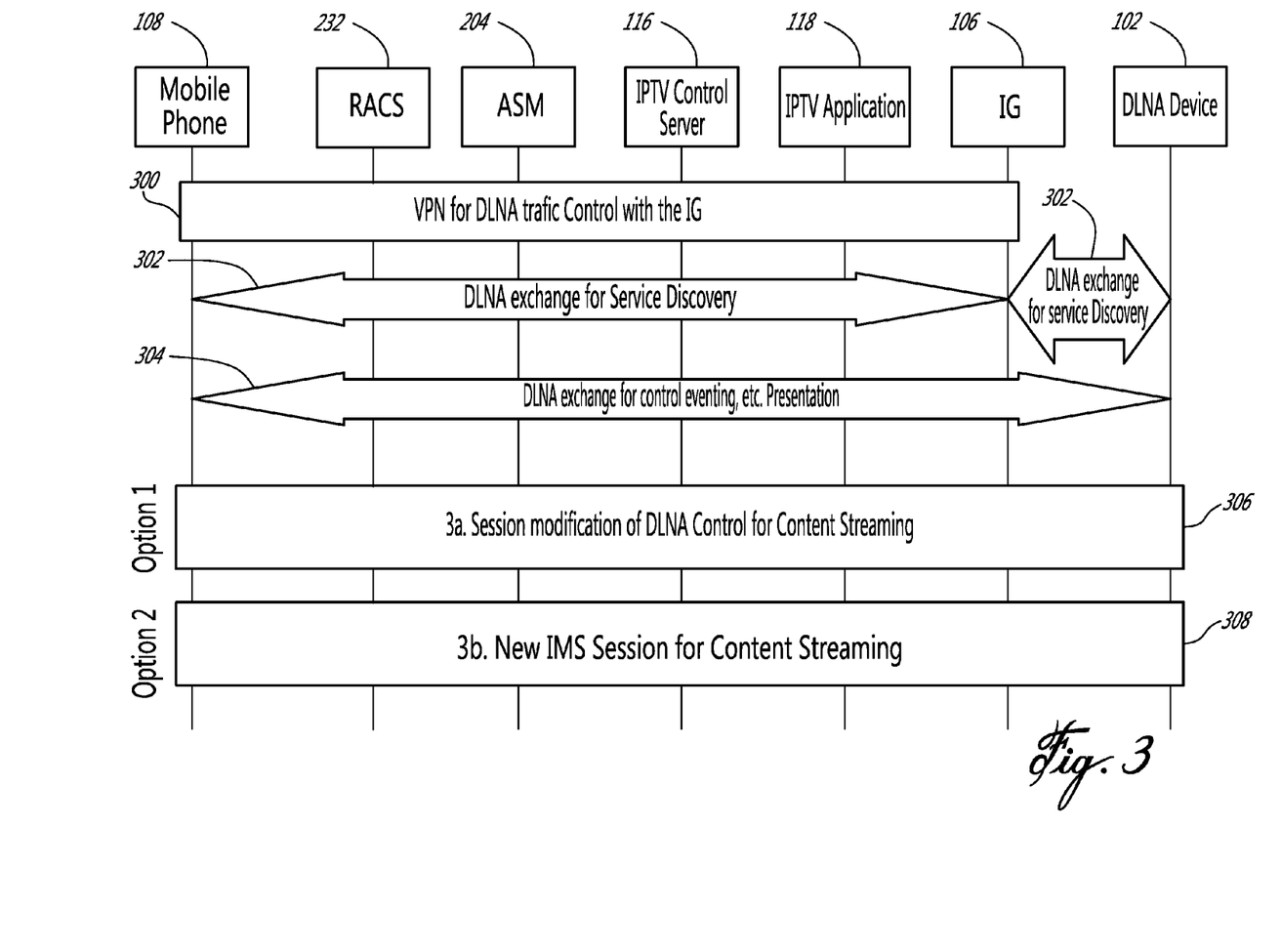
FIG. 3 illustrates the establishment of a first IMS channel for DLNA control signaling and a second IMS channel for remote streaming of a DLNA media channel according to an exemplary embodiment.

FIG. 3 illustrates a general overview of an exemplary call flow for the remote access system and method according to exemplary embodiments after, for example, a VPN has been established with the IG 106 for control of DLNA traffic, e.g., as described above with respect to FIG. 2 and as generally referenced by block 300. At step 302, the mobile device 108 performs a typical DLNA service discovery procedure to discover DLNA devices 102, e.g., in the user's home or workplace, and the services which those DLNA devices 102 support. In step 304, typical DLNA and UPnP procedures are followed to allow the mobile device 108 to select the media to render from one or more of the DLNA devices 102 which can be remotely accessed.

Once the media to be remotely accessed is selected, there are two options for providing network resources via which to stream the remotely accessed media. For example, according to one option shown in block 306, the mobile device 108 can use the DLNA control channel for streaming purposes or it can modify the session SDP to align the DLNA control channel with the QoS for the media to be streamed. In this option 306, the media (encrypted or unencrypted) will be encrypted by the IG 106, which may result in the media potentially being encrypted twice.

Figure 4:
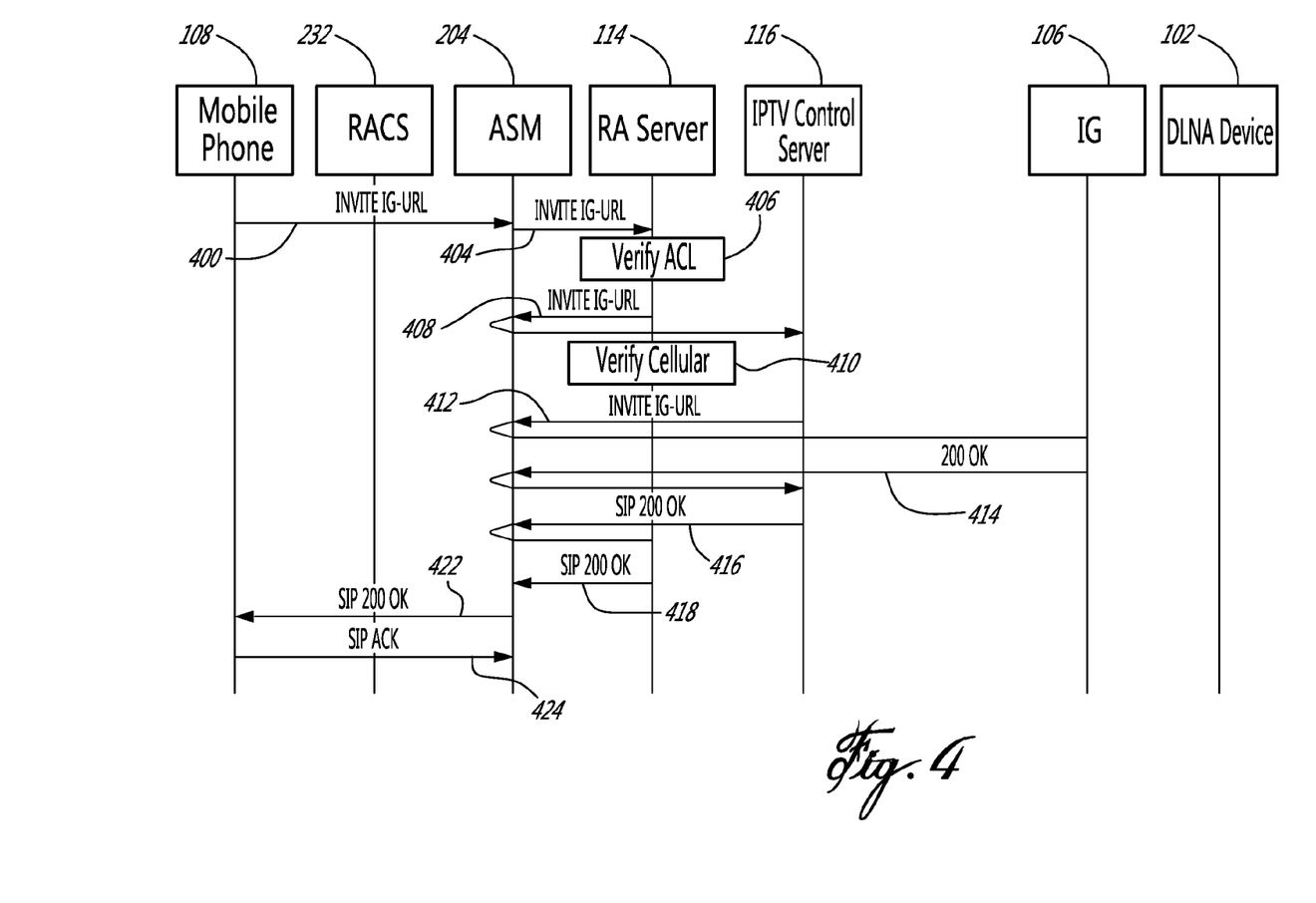
FIG. 4 is a signaling diagram which illustrates signaling associated with an exemplary DLNA media streaming using a separate media channel according to an exemplary embodiment.

Alternatively, and as the focus of the exemplary embodiments described in detail below, the mobile device 108 can set up a new (second) IMS channel (i.e., in addition to the IMS channel being used for DLNA control) with the proper QoS for streaming the selected media to be remotely accessed toward the mobile, as indicated generally by block 308. In this latter option 308, the streamed media will not be encrypted by the IG 106. FIG. 4 illustrates exemplary steps and signals associated with option 308 for establishing the second IMS channel according to an exemplary embodiment, e.g., starting from the perspective that the signaling described above with respect to FIG. 2 to establish the first IMS channel has already occurred.

Therein, in step 400, the mobile device 108 initiates a new IMS session with the IG 106 for the purpose of the DLNA media streaming to remotely access the previously selected media from one of the DLNA devices 102. For that purpose the mobile device 108 sends a SIP INVITE message 400 which is routed to the ASM 204 associated with the IG 106. The SDP in the SIP INVITE message 400 includes, for example, information identifying the media codec(s) supported by the mobile device 108, and also a request that the new IMS channel be established with a QoS of zero. More specifically, in the SDP in the SIP INVITE message 400 there is a b-line parameter that is associated with every m-line (describing every media, one m-line per media item in the session if there is more than one media item in the session) that indicates how much bandwidth is required per media item. The b-line can be specified under each m-line specifying the bandwidth requested per media, or at the session level specifying the QoS for the session as a whole. Thus, according to an exemplary embodiment, a b-line parameter having a value of zero can be defined under the m-line associated with the second IMS channel in an SDP in SIP INVITE message 400.

By requesting that the second IMS channel toward the IG 106 be established with a QoS equal to zero, exemplary embodiments enable the network to omit the typical initial resource reservation step which would normally be triggered by receipt of a SIP INVITE message requesting a new IMS channel. This, in turn, avoids the problem described above that the network (e.g., the GGSN node) cannot perform two different QoS reservations for the same IP address, i.e., that associated with IG 106. Thus, in step/signal 404 the ASM 204 forwards the SIP INVITE message to the RA server 114. The RA server 114 validates the access control list (ACL) for the target user as shown in block 406. In step/signal 408, after authorizing the request, the RA server 114 forwards the incoming SIP INVITE, based on the information in the SDP in the SIP INVITE, to the IPTV control server 116 via ASM 204.

Figure 5:
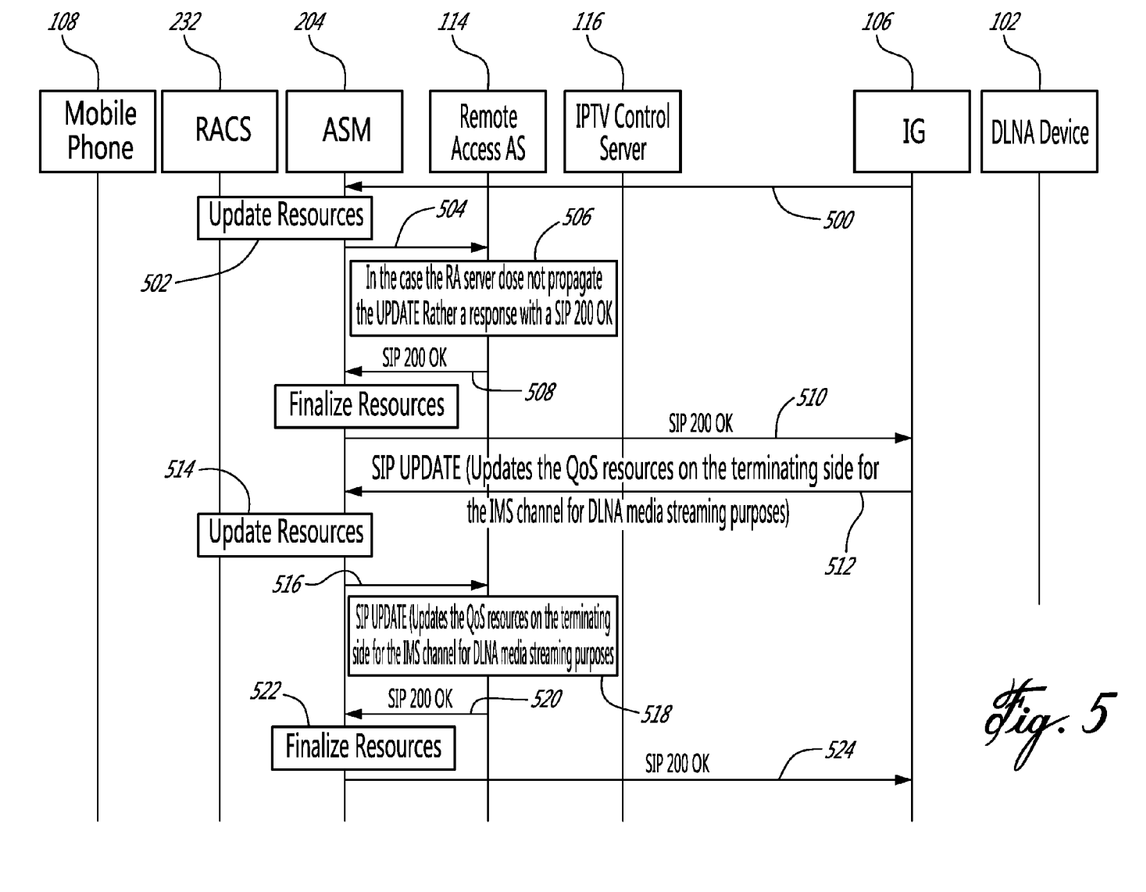
FIG. 5 is a signaling diagram which continues the signaling of the exemplary embodiment of FIG. 4.

As shown by block 410, the RA server 114 verifies whether the SIP INVITE message 406 involves a system access request from a cellular network or non-cellular network If the access is from a cellular network, then the RA server 114 will realize that it later needs to reset the QoS values, as will be described below with respect to FIG. 5. Alternatively, if the RA server 114 and IPTV control server 116 are co-located, then IPTV control server 116 can perform step 410

As shown by step/signal 412, based on, for example, the information in the SDP in the SIP INVITE message 408, and policies in the network, the IPTV control server 116 forwards the SIP INVITE message 412, via the ASM 204, to the IG 106. Since the IG 106 is stateful according to this exemplary embodiment, the IG 106 is aware of the DLNA exchanges that took place a priori, e.g., in FIG. 3, and is also aware of the codec(s) supported by the DLNA device 102 from which content is to be remote accessed, the IG 106 responds to the SIP INVITE message 412 with a SIP 200 OK message 414 indicating the selected codec to be used in subsequent streaming of the content. Additionally, since the IG 106 is aware that the first IMS channel was already allocated to it for DLNA control signaling, the IG 106 shall also indicate a QoS of zero in signal 414 for the second IMS channel.

In step/signal 416, the IPTV control server 116 forwards the SIP200 OK response to the RA server 114, again via ASM 204. The RA server 114 forwards the SIP 200 OK message to the ASM 204 via signal 418, which still includes the QoS equal to zero information for the second channel. Although a final resource modification process would typically occur as a result of the ASM 204 receiving the SIP 200 OK message 418 this, like the initial resource reservation step, is avoided by this exemplary embodiment due to the presence of the QoS equal to zero indication in the signal 418.

By way of step/signal 422, the ASM 204 forwards the SIP 200 OK message to the mobile device 108. The mobile device 108 acknowledges receipt of SIP 200 OK message via SIP ACK messages 424-430 which are promulgated back through the network to IG 106.

Now that the second IMS channel has been established between the mobile device 108 and the IG 106 for delivery of the content to be remotely accessed, exemplary embodiments next proceed to adjust the previously established QoS reservation for the first IMS channel to reflect the total QoS needed for both the first IMS channel and the second IMS channel. Note that in order for the IG 106 to know how much to modify the bandwidth, the IG 106 needs to know the bandwidth required for the content to be streamed via the remote access connection. This information can, for example, be determined from the UPnP procedures (generally indicated by step 304 of FIG. 3) and can be communicated internally in the IG 106 to the IMS application that handles the QoS modification on the IMS side.

Returning to FIG. 4, exemplary steps/signals 432-454 are used to implement this QoS update in the network, e.g., in the GGSN 113, starting with the transmission of a SIP UPDATE message 432 from the IG 106 to update the QoS of the first IMS channel in the GGSN. This updating signaling follows the path of the first IMS established channel, which has, however, been simplified to avoid obscuring the Figure. At step 434, ASM updates the QoS for the terminating side for the first IMS channel. By signal 436, the ASM 204 acknowledges to the RA server 114 the modification to the QoS by the network on the terminating side (however in practice this SIP UPDATE signal 436 would first go to the IPTV control server 116, then back to ASM 204 prior to being sent on to the RA server 114, which comment applies equally to signals 504 and 516 described below). Subsequently, the RA server 114 propagates this signal all the way back to the originating side, as indicated by block 438 and signals 440 and 442. This allows the GGSN 113 to similarly update its QoS setting for the first IMS channel (i.e. to provide the QoS which is cumulative of the two now established IMS channels). The network thus finalizes the resource request associated with first IMS channel in block 444, and acknowledgements are then propagated back through the network via signals 446-452.

At this point in the signaling flow, the GGSN 113 is now properly updated with a single QoS (bandwidth) reservation that is appropriate for the combined first IMS channel and the second IMS channel and that can handle streaming the chosen content. The same applies for the first IMS channel on the terminating side. However, as indicated above, on the terminating side it is desirable that the SBG or edge router 103 have separate, individual QoS reservations for each of the two channels (since these nodes can operate at the port level rather than only at the IP address level). Given that the adjustment that was done for the GGSN 113 described in steps 432-452 in FIG. 4 resulted in the first IMS channel for the terminating side having an undesirable QoS, it is desirable according to this exemplary embodiment to adjust (e.g., reset/restore) the QoS for the first and second IMS channels on the terminating side so that the first IMS channel on the terminating side has the initial QoS established in FIG. 2 for the DLNA traffic, and the QoS for the second IMS channel has the QoS needed to stream the content. Accordingly, FIG. 5 continues the exemplary embodiment of FIG. 4 with the additional QoS updates according to this exemplary embodiment to restore the QoS values on the terminating side for the first and second IMS channels in the edge router or SBG.

For example, in step/signal 500, the IG 106 sends a SIP UPDATE to restore the QoS for the first IMS channel in the SBG or edge router 103 back to its original value (as established in FIG. 2) as shown by block 502. This signaling follows the path of the first IMS established channel, simplified as described above with respect to FIG. 4 and signal 436. Note that in this case, however, that the RA server 114 intercepts the SIP UPDATE 504 and immediately responds with a SIP 200 OK 508, without propagating the SIP UPDATE to the originating side as indicated by block 506 (note that any SIP signaling is end to end so the normal behavior of the RA server 114 is to send the SIP UPDATE all the way to the originating side back to the mobile device 108). There are several ways for the RA server 114 to distinguish this latter case (i.e., a local update) from the former case in block 438 (i.e., where it needs to update the mobile device 108). One way is to include an SDP in the SIP UPDATE message 504 in the second case that instructs the RA server 114 to terminate the SIP UPDATE. Those skilled in the art will appreciate that, however, there are other ways to enable the RA server 114 to behave as described above with respect to the various QoS update messages described herein. In response to the SIP 200 OK message 508, the ASM 204 finalizes the resources for the SBG or edge router 103 for the first IMS channel and acknowledges with SIP 200 OK signal 510.

In steps/signals 512-524, the IG 106 updates the QoS reservation at the SBG or edge router for the second IMS channel on the terminating side of the remote access session. First, the IG 106 sends a SIP UPDATE message 512 including the QoS value for the second IMS channel. The update is then performed at step 514 and a corresponding update message 516 is transmitted by the ASM 204 back toward the RA server 114. Note that in this case, the RA server 114 also intercepts the SIP UPDATE message 516 (as indicated by block 518) and immediately responds with a SIP 200 OK message 520, without propagating the SIP UPDATE message 516 to the originating side (as it would normally do). Final resource reservation for the second IMS channel is performed in step 522, and acknowledgement of this reservation is transmitted back to the IG through the network as signal 524. At this point, both the GGSN and the SBG/Edge router have the proper QoS for enforcement (one flow in GGSN with total QoS for both channels and two streams in SBG/Edge router each with the correct QoS). Accordingly, streaming can be performed to the recipient nodes without the need for double encryption or for multiple IP addresses at the IG 106.

In the above described exemplary embodiment, those skilled in the art will appreciate that the in making the QoS reservations associated with the second IMS channel used for DLNA media streaming, the IPTV control server 116 is linked in independently, since the impacts or modifications associated with this exemplary embodiment are implemented in the RA server 114. However, according to other exemplary embodiments, the re-routing/intercepting of the various messages described above could instead be performed by the IPTV control server 116, alone or in combination with the RA server 114.

In the manner described above, two channels, each with their own QoS value, are created, despite the fact that from the perspective of the GSSN 113 these channels are identical. The impacts of such a channel creation and management mechanism are borne by the IG 106 and/or the Application Servers 114 and/or 116, and thus do not impact upon the specification of how resources are allocated in the IMS network. Note that the impact can also be managed by either the RA application server or the IPTV control server in place of, or in conjunction with, the IG. These are variations in the methods and systems according to exemplary embodiments of the present invention that are fully contemplated and should be considered to be part of the scope of the invention.

Figure 6:
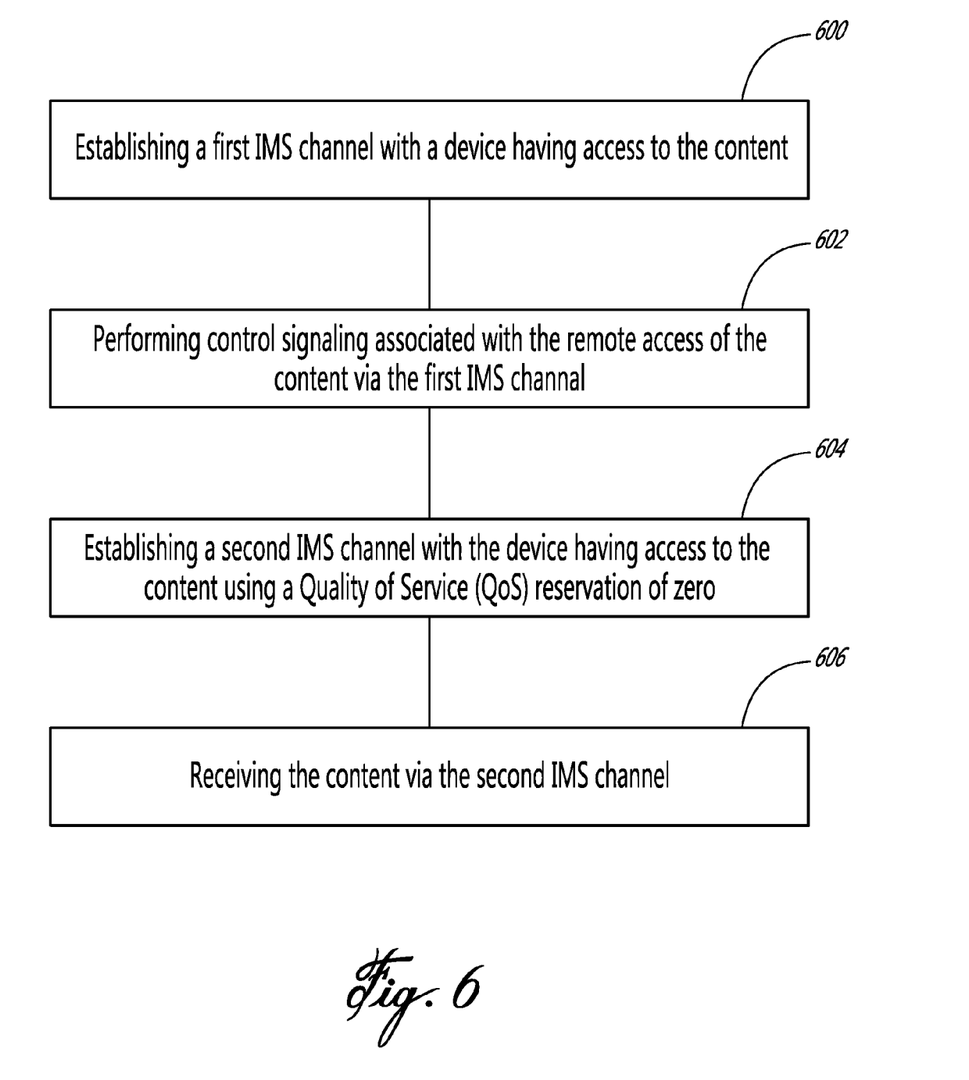
FIG. 6 is a flowchart illustrating a method for remote access of content according to an exemplary embodiment.

Thus, a general method for remotely accessing content according to exemplary embodiments is shown in the flowchart of FIG. 6. Therein, at step 600, a first IMS channel is established with a device having access to the content. Control signaling associated with said remote access of the content is performed via the first IMS channel at step 602. A second IMS channel is established with the device having access to the content using a QoS value of zero (step 604) and the content is then received via the second IMS channel at step 606. It will be appreciated by those skilled in the art that the method illustrated in the flowchart of FIG. 6 is intended to be generic to the operation of a plurality of the nodes and devices described above. For example, the steps illustrated in FIG. 6 can all be performed by the user terminal, e.g., mobile phone 108, in which case the step of establishing a first IMS channel can include transmitting a SIP message including a non-zero Quality of Service (QoS) reservation value, the step of performing control signaling can include performing Digital Living Network Alliance (DLNA) signaling to discover services available from the device having access to the content, and the step of establishing the second IMS channel can include transmitting a SIP message including a Quality of Service (QoS) reservation value of zero.

Alternatively, the method illustrated in FIG. 6 can be performed by an IMS network node, e.g., GGSN 113. In such a case, the step of establishing a first IMS channel can include receiving a first SIP message including a first, non-zero Quality of Service (QoS) reservation value and establishing the first IMS channel toward said IG based on the non-zero QoS reservation value, the step of establishing the second IMS channel towards the IG can include receiving a second SIP message including a second QoS reservation value of zero, and forwarding the second SIP message toward one of a remote access server and an IPTV control server to establish the second IMS channel without updating the non-zero QoS reservation associated with the first IMS channel.

As yet another alternative, the method depicted in the flowchart of FIG. 6 can be performed by the IG 106. In such a case the step of establishing a first IMS channel can include receiving a first SIP message requesting establishment of the first IMS channel with a terminal device and transmitting a second SIP message agreeing to the establishment of the first IMS channel, the step of performing control signaling can include receiving DLNA signaling from a terminal device via said the IMS channel, transmitting DLNA signaling toward the DLNA-compatible device, and transmitting DLNA signaling toward the terminal device via the first IMS channel, while the step of establishing the second IMS channel can include receiving a third SIP message requesting establishment of the second IMS channel with a terminal device, and transmitting a fourth SIP message agreeing to the establishment of the second IMS channel, and the step of receiving the content via the second IMS channel can include receiving the content from the DLNA-compatible device, and transmitting the content via the second IMS channel toward the terminal device. Note that the numerical designators of "first", "second" and "third" as used herein do not necessarily imply a temporal relationship between messages or steps, but are merely used to distinguish one message or step from another.

Figure 7:
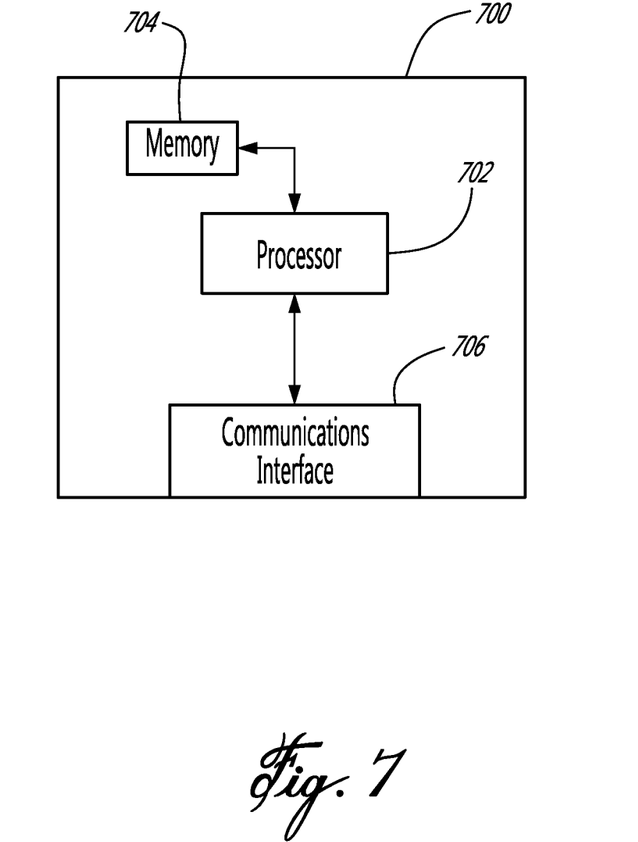
FIG. 7 illustrates a network node or user terminal which can be used in conjunction with the exemplary embodiments.

Additionally, since these various methods implicate different nodes or devices within the system illustrated in FIG. 1, a generic structural version of such nodes or devices is provided as FIG. 7. Therein, the device 700 includes a processor (or multiple processors or processor cores) connected to a memory device 702 and a communications interface 706. The memory device 702 can store one or more software programs which, when executed on the processor 702, operate to perform steps described above and/or to generate signals, e.g., as described above with respect to FIGS. 2-6. If operating as a mobile device 108, the communications interface 706 can, for example, include a wireless transceiver and an antenna. If operating as a GGSN 113, the communications interface 106 can, for example, include the capacity to send signals in accordance with the relevant RAN standard and/or SIP signals. If operating as an IMS network node or IG 106, the communications interface can, for example, include the capacity to send SIP or other IP based signals.

Embodiments of the invention may also be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A method for remote access of content in an Internet Multimedia Subsystem (IMS) communication system, the method comprising:
    establishing a first IMS session between a user equipment (UE) and an IMS Gateway (IG) with an initial Quality of Service (QoS) reservation value equal to a first non-zero value;
    performing control signaling associated with remote access via the first IMS session;
    establishing a second IMS session between the UE and the IG with an initial QoS reservation value equal to zero and preventing a QoS reservation request from being sent to an access network of the UE, the first IMS session and the second IMS session being overlapping in time;
    modifying the initial QoS reservation value associated with the second IMS session, at the IG, to a second non-zero value associated with the content; and
    transmitting the content via the second IMS session.

2. The method of claim 1, wherein the step of establishing a second IMS session between the UE and the IG is responsive to receiving a request for remote access of content from the UE.

3. The method of claim 2, further comprising determining that the UE is connected to a Radio Access Network (RAN).

4. The method of claim 1, further comprising modifying the initial QoS reservation value associated with the first IMS session, at the UE, to a composite value equal to the sum of the first non-zero value and the second non-zero value.

5. The method of claim 4, wherein the initial QoS reservation value associated with the first IMS session is modified, at the UE, to the composite value without propagating the modification to the IG.

6. The method of claim 1, wherein the step of performing control signaling further includes performing Digital Living Network Alliance (DLNA) signaling to discover services available from a device having access to content.

7. The method of claim 6, wherein the device having access to content is a Digital Living Network Alliance (DLNA) compatible device connected to the IG.

8. The method of claim 7, wherein the UE selects media to render from the DLNA compatible device.

9. The method of claim 1, wherein the initial QoS reservation value associated with the second IMS session is modified, at the IG, to the second non-zero value without propagating the modification to the UE.

10. A device for remote access of content in an Internet Multimedia Subsystem (IMS) communication system, the device comprising a memory and a processor, the memory containing instructions executable by the processor whereby the device is operative to:

establish a first IMS session between a user equipment (UE) and an IMS Gateway (IG) with an initial Quality of Service (QoS) reservation value equal to a first non-zero value;

perform control signaling associated with remote access via the first IMS session;

establish a second IMS session between the UE and the IG with an initial Quality of Service (QoS) reservation value equal to zero and preventing a QoS reservation request from being sent to an access network of the UE, the first IMS session and the second IMS session being overlapping in time;

modify the initial QoS reservation value associated with the second IMS session, at the IG, to a second non-zero value associated with the content; and transmit the content via the second IMS session.

11. The device of claim 10, wherein the device is selected from the group including: the UE, the IG, and a Radio Access Network (RAN) node.

12. The device of claim 10, wherein a second IMS session is established between the UE and the IG is responsive to receiving a request for remote access of content from the UE.

13. The device of claim 12, wherein the UE is connected to a Radio Access Network (RAN).

14. The device of claim 10, wherein the device is further operative to modify the initial QoS reservation value associated with the first IMS session, at the UE, to a composite value equal to the sum of the first value and the second value.

15. The device of claim 14, wherein the initial QoS reservation value associated with the first IMS session is modified, at the UE, to the composite value without propagating the modification to the IG.

16. The device of claim 10, wherein the initial QoS reservation value associated with the second IMS session is modified, at the IG, to the second non-zero value without propagating the modification to the UE.

* * * * *